United States Patent [19]

Vanmaele et al.

[11] Patent Number: 5,326,676
[45] Date of Patent: Jul. 5, 1994

[54] DYE-DONOR ELEMENT FOR USE ACCORDING TO LASER-INDUCED THERMAL DYE TRANSFER

[75] Inventors: Luc Vanmaele, Lochristi; Wilhelmus Janssens, Aarschot, both of Belgium

[73] Assignee: AGFA-Gevaert, N.V., Mortsel, Belgium

[21] Appl. No.: 40,605

[22] Filed: Mar. 31, 1993

[30] Foreign Application Priority Data

Apr. 21, 1992 [EP] European Pat. Off. ............ 92201112

[51] Int. Cl.$^5$ .................... G03C 5/54; G03C 1/72; G03C 5/16
[52] U.S. Cl. .................... 430/338; 430/201; 430/944; 430/964; 430/522; 8/471; 503/227
[58] Field of Search ............... 430/200, 201, 964, 338, 430/944; 503/227; 8/471

[56] References Cited

U.S. PATENT DOCUMENTS

| | | | |
|---|---|---|---|
| 5,081,101 | 1/1992 | Evans et al. | 430/201 |
| 5,082,823 | 1/1992 | Vanmaele et al. | 503/227 |
| 5,192,737 | 3/1993 | Kubodera et al. | 430/200 |

Primary Examiner—Richard L. Schilling
Attorney, Agent, or Firm—Breiner & Breiner

[57] ABSTRACT

Dye-donor element for use according to a laser-induced thermal dye transfer, said dye-donor element comprising a support having thereon a dye layer and an infrared-absorbing dye which is different from the dye in the dye-layer, characterized in that said infrared-absorbing dye is a 2-carbazoyl-4-[N-(o,o'-disubstituted, p-substituted aminoaryl)imino]-1,4-quinone or a 2-hydroxaminocarbonyl-4-[N-(o,o'-disubstituted,p-substituted aminoaryl)imino]1,4-quinone.

5 Claims, No Drawings

DYE-DONOR ELEMENT FOR USE ACCORDING TO LASER-INDUCED THERMAL DYE TRANSFER

DESCRIPTION

1. Field of the Invention

This invention relates to dye-donor elements for use according to thermal dye sublimation transfer, in particular laser-induced thermal dye transfer, and more particularly to the use of certain infrared absorbing indoaniline dyes for use in said dye-donor elements.

2. Background of the Invention

Thermal dye sublimation transfer is a recording method in which a dye-donor element provided with a dye layer containing sublimable dyes having heat transferability is brought into contact with a receiver sheet and selectively, in accordance with a pattern information signal, heated with a thermal printing head provided with a plurality of juxtaposed heat-generating resistors, whereby dye from the selectively heated regions of the dye-donor element is transferred to the receiver sheet and forms a pattern thereon, the shape and density of which is in accordance with the pattern and intensity of heat applied to the dye-donor element.

Another way to thermally obtain a print is to use a laser instead of a thermal printing head. In such a system, the donor sheet includes a material which strongly absorbs at the wavelength of the laser. When the donor is irradiated, this absorbing material converts light energy to thermal energy and transfers to heat to the dye in the immediate vicinity, thereby heating the dye to its vaporization temperature for transfer to the receiver. The absorbing material may be present in a layer beneath the dye and/or it may be admixed with the dye. The laser beam is modulated by electronic signals which are representative of the shape and color of the original image, so that each dye is heated to cause volatilization only in those areas in which its presence is required on the receiver to reconstruct the color of the original object. Further details of this process are found in GB 2,083,726, the disclosure of which is hereby incorporated by reference.

In GB 2,083,726, the absorbing material which is disclosed for use in their laser system is carbon. There is a problem with using carbon as the absorbing material in that it is particulate and has a tendency to clump when coated which may degrade the transferred dye image. Also, carbon may transfer to the receiver by sticking or ablation causing a mottled or desaturated color image. Therefore it is desirable to use an absorbing material which does not have these disadvantages.

It is known to use instead of carbon as absorbing material, infrared absorbing dyes that are different from the dyes used in the dye layer. Examples of such infrared absorbing dyes are described in U.S. Pat. No. 4,952,552.

It is an object of the present invention to provide novel infrared absorbing dyes for use according to laser induced thermal dye transfer printing.

Other objects will become apparent from the description hereinafter.

Statement of the Invention

In accordance with the present invention a dye-donor element for use according to laser induced thermal dye transfer is provided, said dye-donor element comprising a support having thereon a dye layer and an infrared absorbing dye which is different from the dye in the dye layer, characterised in that said infrared-absorbing dye is a 2-carbazoyl-4-[N-(o,o'-disubstituted, p-substituted aminoaryl)imino]-1,4-quinone or a 2-hydroxaminocarbonyl-4-[N-(o,o'-disubstituted, p-substituted aminoaryl)imino]1,4-quinone.

DETAILED DESCRIPTION OF THE INVENTION

The quinone may be a benzoquinone or a naphthoquinone, preferably a naphthoquinone.

In a preferred embodiment of the invention, the infrared-absorbing dye of the present invention corresponds to the following general formula (I)

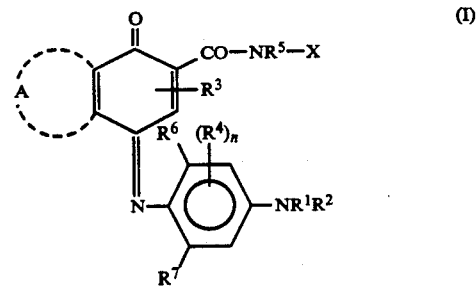

wherein $R^1$ and $R^2$ each independently represent hydrogen, substituted or unsubstituted alkyl, substituted or unsubstituted cycloalkyl, substituted or unsubstituted aryl, or $R^1$ and $R^2$ together represent the atoms necessary for completing a heterocyclic nucleus or substituted heterocyclic nucleus, or $R^1$ and/or $R^2$ together with $R^4$ represent the atoms necessary for completing a fused-on heterocyclic nucleus or substituted fused-on heterocyclic nucleus;

$R^3$ is a substituent chosen from the group consisting of hydrogen, substituted or unsubstituted alkyl, substituted or unsubstituted cycloalkyl, substituted or unsubstituted aryl, substituted or unsubstituted alkoxy, substituted or unsubstituted aryloxy, substituted or unsubstituted amino, hydroxy, nitro, cyano, halogen, —NH—CO—R'; —NH—SO$_2$—R', —NH—PO—R'R", —CO—NH—R', —SO$_2$—NH—R' wherein R' and R" each independently represent substituted or unsubstituted alkyl, substituted or unsubstituted cycloalkyl or substituted or unsubstituted aryl; for $R^3$=—NH-POR'R", R' and R" (same or different) can also represent alkoxy or aryloxy.

$R^6$ and $R^7$ (each independently) represents a halogen, an alkyl group (e.g. methyl, ethyl), an aryl group, an alkoxy group (e.g. methoxy), an alkylthio group (e.g. methylthio) or acylamino; which groups may be substituted;

$R^4$ is a substituent having one of the significances given to $R^6$ and $R^7$, or $R^4$ together with $R^1$ and/or $R^2$ represents the atoms necessary for completing a fused-on heterocyclic nucleus or substituted fused-on heterocyclic nucleus;

n represents an integer equal to 0, 1 or 2;

$R^5$ represents hydrogen, substituted or unsubstituted alkyl, substituted or unsubstituted cycloalkyl or substituted or unsubstituted aryl;

A represents the necessary atoms for constituting an aromatic ring fused-on the benzene nucleus, said ring may also have an $R^3$ substituent, and further A may be a substituent similar to the above $R^3$;

X represents NR$^8$R$^9$ or OR$^{10}$;

R$^8$ and R$^9$ each independently represent hydrogen, substituted or unsubstituted alkyl, substituted or unsubstituted cycloalkyl, substituted or unsubstituted aryl, SO$_2$R$^{11}$, COR$^{11}$ or POR$^{11}$R$^{12}$, or R$^8$ and R$^9$ together represent the atoms necessary for completing a heterocyclic nucleus or substituted heterocyclic nucleus;

R$^{10}$ represents hydrogen, substituted or unsubstituted alkyl, substituted or unsubstituted cycloalkyl, substituted or unsubstituted aryl, SO$_2$R$^{11}$, COR$^{11}$ or POR$^{11}$R$^{12}$;

R$^{11}$ and R$^{12}$ each independently represent substituted or unsubstituted alkyl, substituted or unsubstituted cycloalkyl, substituted or unsubstituted alkenyl, substituted or unsubstituted aralkyl, substituted or unsubstituted aryl, substituted or unsubstituted alkoxy, substituted or unsubstituted aryloxy, substituted or unsubstituted alkylthio, substituted or unsubstituted arylthio, substituted or unsubstituted amino or a substituted or unsubstituted heterocyclic group or R$^{11}$ and R$^{12}$ together form a 5- or 6-membered ring.

Preferably A represents the atoms necessary for constituting a ring fused-on the benzene ring so that the whole forms a naphthalene ring.

Suitable examples of substituents represented by R$^1$, R$^2$ and R$^5$ are i.a. hydrogen, methyl, ethyl, propyl, isopropyl, butyl, pentyl, hexyl, 2-methoxyethyl, benzyl, 2-(methylsulfonylamino)ethyl, 2-hydroxyethyl, 2-cyanoethyl, methoxycarbonylmethyl, 4-sulfobutyl, cyclohexyl, cyclopentyl, cycloheptyl, phenyl, pyridyl, napthyl, p-tolyl, p-chlorophenyl, m-(N-methyl sulfamoyl)phenyl.

Suitable examples of substituents represented by R$^3$ and R$^4$ are i.a. hydrogen, methyl, ethyl, propyl, isopropyl, butyl, pentyl, hexyl, 2-methoxyethyl, 2-cyanoethyl, benzyl, 2-hydroxyethyl, dimethylamino, 2-(methylsulfonylamino)ethyl, methoxy, ethoxy, acetamido, dimethylsulfamoyl, dimethylcarbamoyl, chloro, bromo, fluoro, nitrilo.

Suitable examples of substituents represented by X are i.a. piperidino, pyrrolidino, morpholino, phenylcarbonylamino, phenylsulfonylamino, p-methylphenylsulfonylamino, methoxy, hydroxy, acetoxy, dimethylaminosulfonyloxy, di(phenyloxy)fosforyloxy, ureido, dimethylamino, anilino, diphenylamino.

Suitable examples of substituents represented by R$^6$ and R$^7$ are i.a. methyl, chloro, methoxy, bromo, acetylaminoe.

Infrared dyes included within the scope of the present invention include the following.

TABLE 1

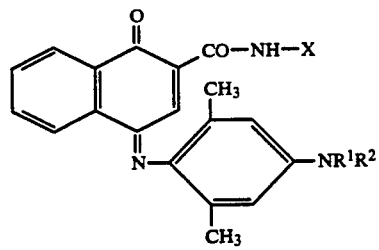

| X | R$^1$ | R$^2$ | no. dye |
|---|---|---|---|
| —OCH$_3$ | C$_4$H$_9$ | C$_4$H$_9$ | C1 |
| —NHC$_6$H$_5$ | C$_4$H$_9$ | C$_4$H$_9$ | C2 |

TABLE 1-continued

| X | R$^1$ | R$^2$ | no. dye |
|---|---|---|---|
| —N(morpholino) | C$_4$H$_9$ | C$_4$H$_9$ | C3 |
| —N(piperidino) | C$_4$H$_9$ | C$_4$H$_9$ | C4 |
| —NHSO$_2$—(p-tolyl) | C$_4$H$_9$ | C$_4$H$_9$ | C5 |
| —OCH$_3$ | C$_2$H$_5$ | C$_2$H$_5$ | C6 |
| —NHC$_6$H$_5$ | C$_2$H$_5$ | C$_2$H$_5$ | C7 |
| —N(morpholino) | C$_2$H$_5$ | C$_2$H$_5$ | C8 |
| —N(piperidino) | C$_2$H$_5$ | C$_2$H$_5$ | C9 |
| —NH—C$_6$H$_5$ | C$_2$H$_4$OH | C$_2$H$_5$ | C10 |
| —N(piperidino) | C$_2$H$_4$OH | C$_2$H$_5$ | C11 |

In the above table C$_4$H$_9$ represents an n-butyl group.

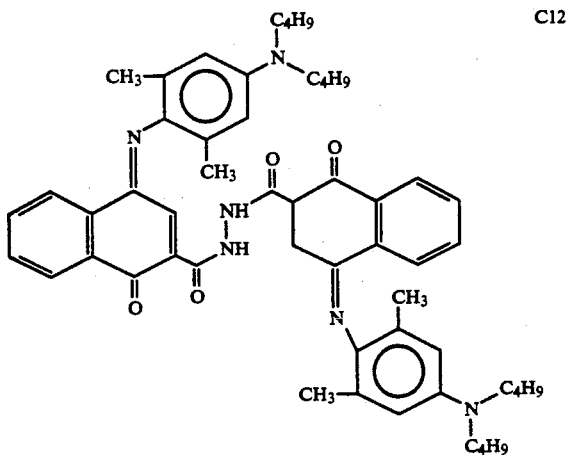

C12

The absorption maxima ($\lambda_{max}$) and molar extinction coefficients ($\epsilon$) of some dyes identified below were determined in methanol. The results are listed in table 2.

TABLE 2

| dye | $\lambda_{max}$ (nm) | $\epsilon$(mol$^{-1}$ cm$^{-1}$ l) |
| --- | --- | --- |
| C1 | 748 | 13101 |
| C3 | 754 | 11036 |
| C4 | 753 | 10588 |
| C12 | 828 | 31764 |

Infrared dyes according to the present invention can be obtained by the oxidative coupling method known in the art between p-phenylenediamine compounds or p-nitrosoaniline compounds and the appropriate novel 2-carbazoyl or 2-hydroxaminocarbonyl phenols or naphthols as described in EP-A-0393252.

Representative examples of suitable p-phenylenediamine compounds are: 2,6-dimethyl-4-N,N-dimethylamino aniline, 2,6-dimethyl-4-N,N-diethylamino aniline, 2,6-dimethyl-4-(N-ethyl,N-hydroxyethyl)amino aniline, 2,6 -dimethyl-4-(N-ethyl,N-cyanomethyl)amino aniline, 2,6-dimethyl-4-(N-ethyl,N-ethylsulfonic acid-)amino aniline, 2,6-dimethyl,4-(N,N-diethylacetate)amino aniline, 2,6-dimethyl,4-(N,N-dihydroxyethyl)amino aniline, 2,3,5,6-tetramethyl-4-N,N-diethylamino aniline, 2,6-dimethyl-4-piperidino aniline, 2,6-dimethyl-4-morpholino aniline, 2,6-dimethyl-4-pyrrolidyl aniline, 2,6-dimethyl-4-imidazolo aniline.

These dyes can also be used as infrared filter dyes, e.g. for silver halide color photographic materials and also as antihalation dyes.

According to a preferred embodiment of this invention these dyes are used as infrared absorbing compounds in a layer of a dye-donor element for use according to laser-induced thermal dye transfer, being different from the dyes in the dye layer. Said infrared dyes may be present in a layer adjacent to the dye layer; preferably they are present in the dye layer itself.

The above infrared absorbing dyes may be employed in any concentration which is effective for the intended purpose. In general, good results have been obtained at a concentration from about 0.05 to about 0.5 g/sq.m within the dye layer itself or in an adjacent layer.

The dye layer is formed preferably by adding the dyes, a polymeric binder medium, and other optional components to a suitable solvent or solvent mixture, dissolving or dispersing the ingredients to form a coating composition that is applied to a support, which may have been provided first with an adhesive or subbing layer, and dried.

Any dye can be used in the dye/binder layer of the dye-donor element of the present invention provided it is easily transferable to the receiver sheet by the action of heat and has a satisfactory fastness to light. Suitable dyes are those described in e.g. EP-A 209,990, EP-A 209,991, EP-A 216,483, EP-A 218,397, EP-A 227,095, EP-A 227,096, EP-A 229,374, EP-A 257,577, EP-A 257,580, EP-A 400706, EP-A 453020, JP 84/78894, JP 84/78895, JP 84/78896, JP 84/227,490, JP 84/227,948, JP 85/27594, JP 85/30391, JP 85/229,787, JP 85/229,789, JP 85/229,790, JP 85/229,791, JP 85/229,792, JP 85/229,793, JP 85/229,795, JP 86/41596, JP 86/268,493, JP 86/268,494, JP 86/268,495, and JP 86/284,489.

The dye layer thus formed generally has a thickness of about 0.2 to 5.0 $\mu$m, preferably 0.4 to 2.0 $\mu$m, and the amount ratio of dye to binder is generally between 9:1 and 1:3 by weight, preferably between 2:1 and 1:2 by weight.

As polymeric binder the following can be used: cellulose derivatives, such as ethyl cellulose, hydroxyethyl cellulose, ethylhydroxy cellulose, ethylhydroxyethyl cellulose, hydroxypropyl cellulose, methyl cellulose, nitrocellulose, cellulose acetate formate, cellulose acetate hydrogen phthalate, cellulose acetate, cellulose acetate propionate, cellulose acetate butyrate, cellulose acetate pentanoate, cellulose acetate benzoate, cellulose triacetate; vinyl-type resins and derivatives, such as polyvinyl alcohol, polyvinyl acetate, polyvinyl butyral, copolyvinyl butyral-vinyl acetal-vinyl alcohol, polyvinyl pyrrolidone, polyvinyl acetoacetal, polyacrylamide; polymers and copolymers derived from acrylates and acrylate derivatives, such as polyacrylic acid, polymethyl methacrylate and styrene-acrylate copolymers; polyester resins; polycarbonates; copolystyrene-acrylonitrile; polysulfones; polyphenylene oxide; organosilicones, such as polysiloxanes; epoxy resins and natural resins, such as gum arabic.

The coating layer may also contain other additives, such as curing agents, preservatives, etc., these and other ingredients being described more fully in EP 133011, EP 133012, EP 111004 and EP 279467.

Any material can be used as the support for the dye-donor element provided it is dimensionally stable and capable of withstanding the temperatures involved, up to 400° C. over a period of up to 20 msec, and is yet thin enough to transmit heat applied on one side through to the dye on the other side to effect transfer to the receiver sheet within such short periods, typically from 1 to 10 msec. Such materials include sheets or films of polyester such as polyethylene terephthalate, polyamide, polyacrylate, polycarbonate, cellulose ester, fluorinated polymer, polyether, polyacetal, polyolefin, polyimide, glassine paper and condenser paper. Preference is given to a support comprising polyethylene terephthalate. In general, the support has a thickness of 2 to 30 $\mu$m. The support may also be coated with an adhesive or subbing layer, if desired.

The dye layer of the dye-donor element may be coated on the support or printed thereon by a printing technique such as a gravure process.

A dye-barrier layer comprising a hydrophilic polymer may also be employed in the dye-donor element between its support and the dye layer to improve the dye transfer densities by preventing wrong-way transfer of dye towards the support. The dye barrier layer may contain any hydrophilic material which is useful for the intended purpose. In general, good results have been obtained with gelatin, polyacryl amide, polyisopropyl acrylamide, butyl methacrylate grafted gelatin, ethyl methacrylate grafted gelatin, ethyl acrylate grafted gelatin, cellulose monoacetate, methyl cellulose, polyvinyl alcohol, polyethylene imine, polyacrylic acid, a mixture of polyvinyl alcohol and polyvinyl acetate, a mixture of polyvinyl alcohol and polyacrylic acid or a mixture of cellulose monoacetate and polyacrylic acid. Suitable dye barrier layers have been described in e.g. EP 227091 and EP 228065. Certain hydrophilic polymers, for example those described in EP 227091, also have an adequate adhesion to the support and the dye layer, thus eliminating the need for a separate adhesive or subbing layer. These particular hydrophilic polymers used in a single layer in the donor element thus perform a dual function, hence are referred to as dye-barrier/-subbing layers.

Preferably the reverse side of the dye-donor element can be coated with a slipping layer to prevent the printing head from sticking to the dye-donor element. Such a slipping layer would comprise a lubricating material such as a surface active agent, a liquid lubricant, a solid lubricant or mixtures thereof, with or without a polymeric binder. The surface active agents may be any agents known in the art such as carboxylates, sulfonates, phosphates, aliphatic amine salts, aliphatic quaternary ammonium salts, polyoxyethylene alkyl ethers, polyethylene glycol fatty acid esters, fluoroalkyl $C_2$-$C_{20}$ aliphatic acids. Examples of liquid lubricants include silicone oils, synthetic oils, saturated hydrocarbons and glycols. Examples of solid lubricants include various higher alcohols such as stearyl alcohol, fatty acids and fatty acid esters. Suitable slipping layers are described in e.g. EP 138483, EP 227090, U.S. Pat. Nos. 4,567,113, 4,572,860, 4,717,711, and in EP application No. 91202071.

The support for the receiver sheet that is used with the dye-donor element may be a transparent film of e.g. polyethylene terephthalate, a polyether sulfone, a polyimide, a cellulose ester or a polyvinyl alcohol-co-acetal. The support may also be a reflective one such as baryta-coated paper, polyethylene-coated paper or white polyester i.e. white-pigmented polyester.

To avoid poor adsorption of the transferred dye to the support of the receiver sheet this support must be coated with a special surface, a dye-image-receiving layer, into which the dye can diffuse more readily. The dye-image-receiving layer may comprise, for example, a polycarbonate, a polyurethane, a polyester, a polyamide, polyvinyl chloride, polystyrene-co-acrylonitrile, polycaprolactone or mixtures thereof. Suitable dye-receiving layers have been described in e.g. EP 133011, EP 133012, EP 144247, EP 227094, EP 228066. Alternatively the dye-image receiving layer comprises a cured reaction product of poly(vinylalcohol-vinylacetate-vinylchloride) and isocyanate.

In order to improve the light resistance and other stabilities of recorded images, UV absorbers, singlet oxygen quenchers such as HALS-compounds (Hindered Amine Light Stabilizers) and/or antioxidants may be incorporated into the receiving layer.

The dye layer of the dye-donor element or the dye-image-receiving layer of the receiver sheet may also contain a releasing agent that aids in separating the dye-donor element from the dye-receiving element after transfer. The releasing agents can also be applied in a separate layer on at least part of the dye layer or of the receiving layer. For the releasing agent solid waxes, fluorine- or phosphate-containing surfactants and silicone oils are used. Suitable releasing agents are described in e.g. EP 133012, JP 85/19138, EP 227092.

The dye-donor elements according to the invention are used to form a dye transfer image. Such a process comprises placing the dye layer of the donor element in face-to-face relation with the dye-receiving layer of the receiver sheet and imagewise heating from the back of the donor element. The transfer of the dye is accomplished e.g. by heating or flashing.

When the process is performed for but one single color, a monochrome dye transfer image is obtained. A multicolor image can be obtained by using a donor element containing three or more primary color dyes, and sequentially performing the process steps described above for each color. After the first dye has been transferred, the elements are peeled apart. A second dye-donor element (or another area of the donor element with a different dye area) in then brought in register with the dye-receiving element and the process is repeated. The third color and optionally further colors are obtained in the same manner.

Several different kinds of lasers could conceivably be used to effect the thermal transfer of dye from the donor sheet to the receiver, such as ion gas lasers like argon and krypton; metal vapor lasers such as copper, gold, and cadmium; solid state lasers such as ruby or YAG; or diode lasers such as gallium arsenide emitting in the infrared region from 750 to 870 nm. However, in practice, the diode lasers offer substantial advantages in terms of their small size, low cost, stability, reliability, ruggedness, and ease of modulation. In practice, before any laser can be used to heat a dye-donor element, the laser radiation must be absorbed into the dye layer and converted to heat by a molecular process known as internal conversion. Thus, the construction of a useful dye layer will depend not only on the hue, sublimability and intensity of the image dye, but also on the ability of the dye layer to absorb the radiation and convert it to heat.

Lasers which can be used to transfer dye from the dye-donor elements of the invention are available commercially. There can be employed, for example, Laser Model SDL-2420-H2 from Spectrodiode Labs, or Laser Model SLD 304 V/W from Sony Corp.

A thermal dye transfer assemblage of the invention comprises (a) a dye-donor element as described above, and (b) a dye-receiving element as described above, the dye-receiving element being in a superposed relationship with the dye-donor element so that the dye layer of the donor element is adjacent to and overlying the image-receiving layer of the receiving element.

The above assemblage comprising these two elements may be preassembled as an integral unit when a monochrome image is to be obtained. This may be done by temporarily adhering the two elements together at their margins. After transfer, the dye-receiving element is then peeled apart to reveal the dye transfer image.

When a three-color image is to be obtained, the above assemblage is formed on three occasions during the time when heat is applied using the laser beam. After the first dye is transferred, the elements are peeled apart. A second dye-donor element (or another area of the donor element with a different dye area) is then brought in register with the dye-receiving element and the process repeated. The third color is obtained in the same manner.

The following examples are provided to illustrate the invention in more detail without limiting, however, the scope thereof.

EXAMPLES

A dye-donor element for use according to thermal dye sublimation transfer was prepared as follows:

A solution of 50 mg of dye as identified below, 50 mg of infrared-absorbing dye as identified below, and 50 mg of co-acrylonitrile-styrene binder in 10 ml of methylethylketone was prepared. From this solution a layer having a wet thickness of 100 μm was coated on 5 μm polyethylene terephthalate film. The resulting layer was dried by evaporation of the solvent.

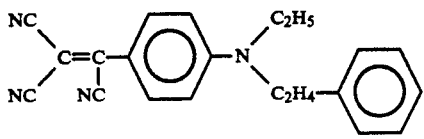

magenta dye D1

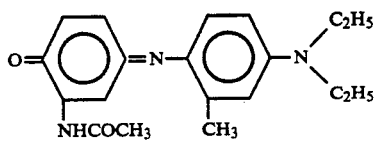

cyan dye D2

Control dye-donor elements were made as described above containing no infrared-absorbing dyes.

As dye receiving elements were used commercially available Mitsubishi materials type CK100TS (film) and CK100S (paper).

The dye-receiver was overlaid with the dye-donor element placed on a x-y table with vacuum suction. The assembly was exposed with a focused laser SONY SLD204V type AlGaAs, pulse 100 μs, wavelength 820 nm, spot diameter 5 μm. The power level of the laser was approximately 22 milliwatts and the exposure energy was 1 erg.μm².

With this assembly a square figure has been written consisting of 12.5 lines with a line distance of 4 μm and a dot distance of 5 μm.

The obtained densities were measured by a Quantimet 970 densitometer in profile mode, in green for the magenta dye, in red for the cyan dye.

The results are given in table 3.

TABLE 3

| Color Dye | Infrared absorbing dye | Density on CK100S | Density on CK100TS |
|---|---|---|---|
| D1 | None (control) | 0.0 | 0.0 |
| D1 | C1 | 0.14 | 0.40 |
| D1 | C3 | — | 0.10 |
| D1 | C4 | — | 0.06 |
| D2 | None (control) | 0.0 | 0.0 |
| D2 | C1 | 0.36 | 0.35 |
| D2 | C3 | 0.36 | 0.07 |
| D2 | C4 | — | 0.23 |

We claim:

1. Dye-donor element for use according to laser-induced thermal dye transfer, said dye-donor element comprising a support having thereon a dye layer and an infrared-absorbing dye which is different from the dye in the dye-layer, characterized in that said infrared-absorbing dye is a 2-carbazoyl-4-[N-(o,o'-disubstituted, p-substituted aminoaryl)imino]-1,4-quinone or a 2-hydroxaminocarbonyl-4-[N-(o,o'-disubstituted, p-substituted aminoaryl)imino]1,4-quinone.

2. Dye-donor element according to claim 1, wherein the quinone is a naphthoquinone.

3. Dye-donor element according to claim 1, wherein said infrared-absorbing dye corresponds to the following general formula (I):

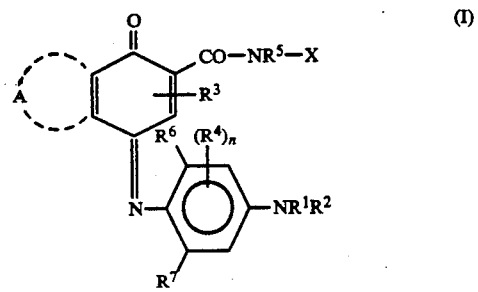

wherein
$R^1$ and $R^2$ each independently represent hydrogen, substituted or unsubstituted alkyl, substituted or unsubstituted cycloalkyl, substituted or unsubstituted aryl, or $R^1$ and $R^2$ together represent the atoms necessary for completing a heterocyclic nucleus or substituted heterocyclic nucleus, or $R^1$ and/or $R^2$ together with $R^4$ represent the atoms necessary for completing a fused-on heterocyclic nucleus or substituted fused-on heterocyclic nucleus;

$R^3$ is a substituent chosen from the group consisting of hydrogen, substituted or unsubstituted alkyl, substituted or unsubstituted cycloalkyl, substituted or unsubstituted aryl, substituted or unsubstituted alkoxy, substituted or unsubstituted aryloxy, substituted or unsubstituted amino, hydroxy, nitro, cyano, halogen, —NH—CO—R'; —NH—SO₂—R', —NH—PO—R'R", —CO—NH—R', —SO₂—N-H—R' wherein R' and R" each independently represent substituted or unsubstituted alkyl, substituted or unsubstituted cycloalkyl or substituted or unsubstituted aryl; for $R^3$=—NH—PO—R'R", R' and R"(each independently) can also represent alkoxy or aryloxy;

$R^6$ and $R^7$ each independently represents a halogen, an alkyl group, an aryl group, an alkoxy group, an alkylthio group which groups may be substituted;

$R^4$ is a substituent having one of the significances given to $R^6$ and $R^7$, or $R^4$ together with $R^1$ and/or $R^2$ represents the atoms necessary for completing a fused-on heterocyclic nucleus or substituted fused-on heterocyclic nucleus;

n represents an integer equal to 0, 1 or 2;

$R^5$ represents hydrogen, substituted or unsubstituted alkyl, substituted or unsubstituted cycloalkyl or substituted or unsubstituted aryl;

A represents the necessary atoms for constituting an aromatic ring fused-on the benzene nucleus, said ring may also have an $R^3$ substituent, or A represents a substituent chosen from the group given for $R^3$;

X represents $NR^8R^9$ or $OR^{10}$;

$R^8$ and $R^9$ each independently represent hydrogen, substituted or unsubstituted alkyl, substituted or unsubstituted cycloalkyl, substituted or unsubstituted aryl, $SO_2R^{11}$, $COR^{11}$ or $POR^{11}R^{12}$, or $R^8$ and $R^9$ together represent the atoms necessary for completing a heterocyclic nucleus or substituted heterocyclic nucleus;

$R^{10}$ represents hydrogen, substituted or unsubstituted alkyl, substituted or unsubstituted cycloalkyl, substituted or unsubstituted aryl, $SO_2R^{11}$, $COR^{11}$ or $POR^{11}R^{12}$;

$R^{11}$ and $R^{12}$ each independently represent substituted or unsubstituted alkyl, substituted or unsubstituted cycloalkyl, substituted or unsubstituted alkenyl, substituted or unsubstituted aralkyl, substituted or unsubstituted aryl, substituted or unsubstituted alkoxy, substituted or unsubstituted aryloxy, substituted or unsubstituted alkylthio, substituted or unsubstituted arylthio, substituted or unsubstituted amino or a substituted or unsubstituted heterocyclic group or $R^{11}$ and $R^{12}$ together form a 5- or 6-membered ring.

4. Dye-donor element according to claim 1, wherein said infrared-absorbing dyes are present in the dye layer.

5. Dye-donor element according to claim 1, wherein said infrared-absorbing dyes are employed at a concentration from about 0.05 to about 0.5 g/sq.m.

* * * * *